United States Patent
Nishiyama

Patent Number: 6,091,452
Date of Patent: Jul. 18, 2000

[54] FOCUS CONTROLLING METHOD AND APPARATUS WHICH USES DIFFERENT FOCUSING PARAMETERS AND/OR SELECTS AN IMAGE HAVING A BEST FOCUS

[75] Inventor: Kiyoharu Nishiyama, Tokyo, Japan

[73] Assignee: Ricoh Company, Ltd., Tokyo, Japan

[21] Appl. No.: 08/522,666

[22] Filed: Sep. 1, 1995

[30] Foreign Application Priority Data

Sep. 1, 1994 [JP] Japan ................................. 6-208687

[51] Int. Cl.⁷ .................................................. H04N 5/232
[52] U.S. Cl. ........................................... 348/349; 348/345
[58] Field of Search .................................... 348/223, 226, 348/231, 241, 345, 349, 354, 358, 362, 364, 296, 220, 297, 370, 371, 352, 355, 356, 311, 312, 313; 396/222; H04N 5/232

[56] References Cited

U.S. PATENT DOCUMENTS

| | | | |
|---|---|---|---|
| 5,075,777 | 12/1991 | Murata | 348/354 |
| 5,101,276 | 3/1992 | Ohta | 348/364 |
| 5,206,730 | 4/1993 | Sakai | 348/220 |
| 5,384,595 | 1/1995 | Sakaguchi | 348/226 |
| 5,430,483 | 7/1995 | Haruki | 348/226 |
| 5,486,893 | 1/1996 | Takagi | 396/222 |

FOREIGN PATENT DOCUMENTS

5-236328  10/1993  Japan .

Primary Examiner—Tuan Ho
Attorney, Agent, or Firm—Oblon, Spivak, McClelland, Maier & Neustadt, P.C.

[57] ABSTRACT

A focusing method and apparatus which changes the shutter speed and/or the focusing sampling frequency in order to increase the speed at which an image is brought into focus while at the same time, preventing the influence of flicker from artificial light powered by an AC power source. As the focus evaluation value is based on the brightness of a signal, shutter speeds and frequencies are set in order to avoid the influence of flicker on the focusing process. A shutter speed of 1/100th of a second with a sampling frequency of 60 Hz can be used in environments which are sufficiently bright in order to increase the focusing speed. Also, the focusing sampling frequency may be set to be large when the focus is far from the focusing point in order to quickly bring the image into focus and the sampling frequency subsequently decreases as the focusing position is approached in order to reduce the chances that the focusing position will be passed. Another feature is to record images as the focus position is being approached so that when the in-focus position is passed, there is no need to back up the focusing lens to the in-focus position to obtain the still image as the still image will have been previously recorded. The other frames which have been recorded may then be discarded.

34 Claims, 7 Drawing Sheets

FOCUS CONTROLLING METHOD AND APPARATUS WHICH USES DIFFERENT FOCUSING PARAMETERS AND/OR SELECTS AN IMAGE HAVING A BEST FOCUS

BACKGROUND OF THE INVENTION

1. Field of the Invention

The present invention relates to a focus controlling method and apparatus in an electronic moving picture or still camera. The present invention further relates to using variable focus sampling periods and/or shutter speeds depending on a focus evaluation value, brightness of the image, and/or recording mode.

2. Description of the Related Art

Today, almost all video and electronic still cameras include an automatic focusing mechanism. One type of automatic focusing mechanism which may be applied in these cameras is a mountain climbing servo-type automatic focusing method. The focus control of this type of camera operates to drive a motor which is connected to a focusing lens so that a maximum focus evaluation value is obtained. The focus evaluation value plotted versus different lens positions has the general shape of a mountain with the peak of the mountain being the best focusing position. Typically, the focus motor is driven at a high speed when the sharpness is low and the motor is driven at slower speeds when the sharpness is high and the focus evaluation value approaches a maximum value.

One way of obtaining the focus evaluation value is to obtain the luminance or brightness component of a detected picture. The luminance or brightness component is passed through a high pass filter and then integrated. The sharper or more focused the picture, the more high frequencies will be present in the picture, indicating that the picture is more focused. However, as the focus evaluation value in this type of system is determined using the high frequency components of the luminance value, not only does the focus evaluation value depend on the extent to which the image is in focus but the focus evaluation value will also vary with the brightness of the image being detected.

Figure 1:
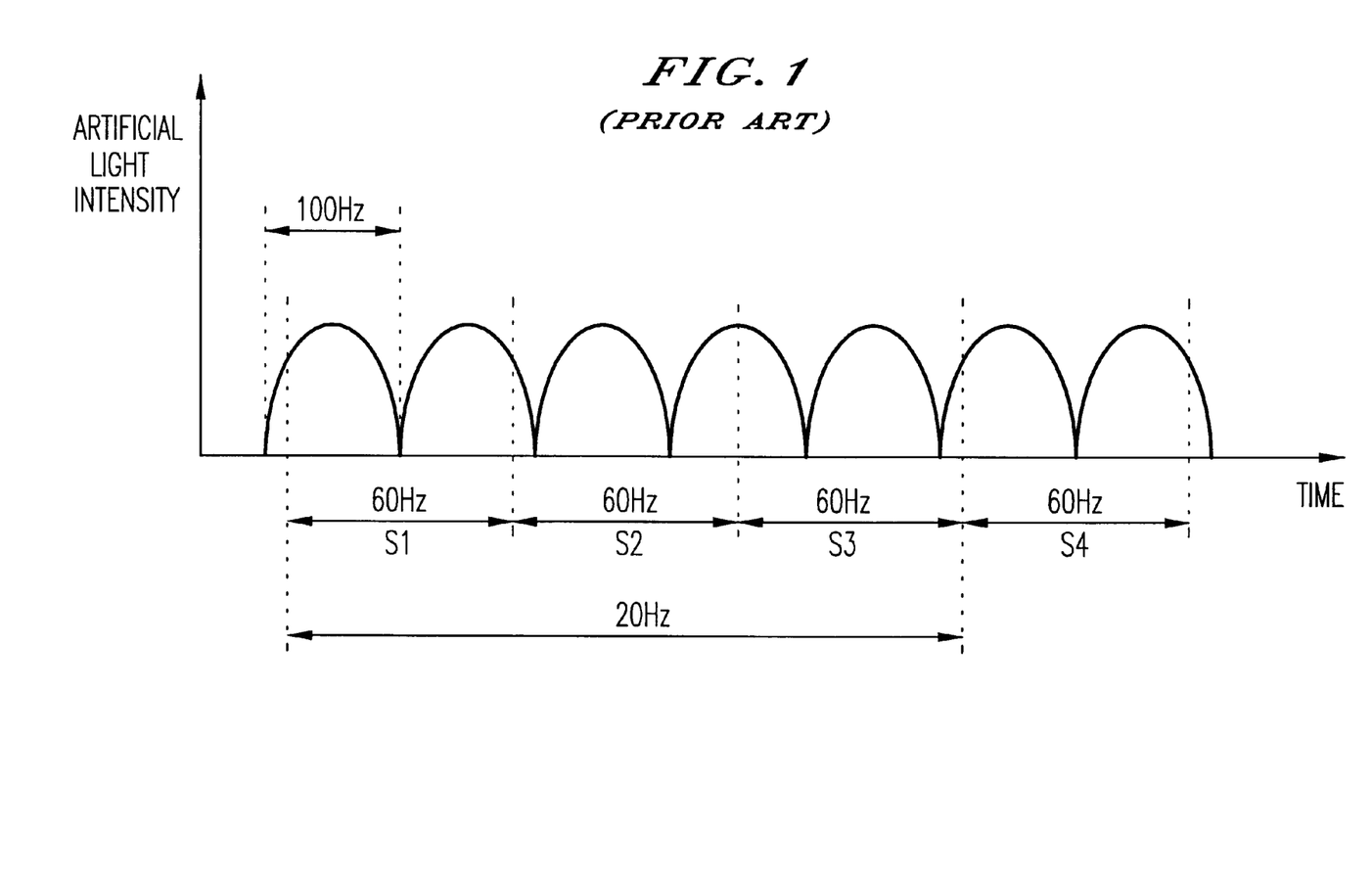
FIG. 1 illustrates the intensity of an artificial light source supplied by a 50 Hz power supply over a period of time and a convention manner of sampling in order to prevent flicker.

In automatic focusing systems, noise of the focusing signal may be a problem. In particular, the flicker of artificial light sources causes the brightness of an image to change when the artificial light is being generated using an AC power source. For example, FIG. 1 illustrates the intensity of an artificial light source plotted over time. In FIG. 1, the changing brightness which has a frequency of 100 Hz is produced when an AC power supply is connected to the artificial light source. In the United States or other locations where the AC frequency is 60 Hz, the flicker frequency of artificial light is 120 Hz. The flickering occurs in both incandescent AC lighting and is especially troublesome for automatic focusing mechanisms in the presence of fluorescent light. Even though a flickering of 100 Hz or 120 Hz may present difficulty in an electronic focusing system, this flickering is not noticeable to the human eye.

In FIG. 1, if the image is sampled every 60 Hz as indicated by sampling periods S1, S2, S3, and S4, it can be seen that the artificial light intensity for these three periods is different. Therefore, if a focus evaluation value is based on or affected by the light intensity, it may be difficult to provide an adequate focusing mechanism when the artificial light intensity has a frequency of 100 Hz and the sampling frequency is 60 Hz.

Some regions of the world have a power supply frequency of 50 Hz whereas others, such as the United States have a frequency of 60 Hz. So that a single camera may be manufactured for use both in regions having 50 Hz power sources and 60 Hz power sources, a solution to this flicker problem is desired.

A known solution proposed to this problem is disclosed in Japanese Laid Open Patent Publication No. 5-236328 (1993), which is incorporated herein by reference. In this proposed solution, a sampling is performed with a frequency of 20 Hz. For example, the first sampling is at period S1 and subsequently at period S4, as illustrated in FIG. 1. As every third 60 Hz cycle ($\frac{1}{60}$ second period) has the same brightness when the light source has a 100 Hz flicker rate, sampling every 20 Hz (every third 60 Hz period) eliminates the flicker problem. Additionally, the above described solution also eliminates flicker problems when the flicker is 120 Hz because each 60 Hz sampling period will always have the same flicker. Typically, a frame of an image consists of an even field and an odd field which are assembled together to form a frame. In FIG. 1, an even field can be captured during sampling period S1, an odd field during S2, etc.

However, a problem with the above described solution is that when the focus evaluation value is sampled with a frequency of 20 Hz which is $\frac{1}{3}$ of the vertical or field frequency (60 Hz) of the video signal, the time needed to focus the camera increases. If the focus sampling value is increased three-fold by changing the sampling frequency from 60 Hz to 20 Hz, the automatic focus evaluation takes almost three times the amount of time as is required when the sampling frequency is 60 Hz.

SUMMARY OF THE INVENTION

Accordingly, it is an object of the invention to provide a rapid automatic focusing system based on a luminance signal which operates in environments illuminated by artificial light sources powered by both 50 Hz and 60 Hz power sources. It is another object of this invention to provide this automatic focusing method in an amount of time which is quicker than conventional solutions.

It is a further object of the invention to provide an automatic focusing method which is usable in both moving picture and still picture recording modes which achieves a fast focusing value.

It is yet another object of this invention to provide a focusing mechanism usable in a still image mode which acquires a focussed image quickly by recording images as the best focussed point on the mountain climbing curve is passed.

These and other objects are accomplished by a novel focusing method and apparatus in which a focus evaluation result is determined based on a brightness of a detected image. Initially, the shutter speed is set at $\frac{1}{60}$ second, a field is captured every 60 Hz and the sampling frequency for focusing is set at 20 Hz. If a detected focus evaluation value is greater than a reference value, then the shutter speed is set to $\frac{1}{100}$ of a second and the sampling frequency is set to 60 Hz. As the frequency of the artificial light is 100 Hz when the power supply has a frequency of 50 Hz and the frequency of the flicker is 120 Hz when the frequency of the power supply is 60 Hz, flicker will be eliminated for both power supply frequencies because a shutter speed of 100 Hz will always result in an amount of light which is constant when the flicker frequency is 100 Hz. When the flicker frequency is 120 Hz, sampling every 60 Hz results in a constant amount of light. As a shutter speed of $\frac{1}{100}$ second captures less light than a shutter speed of $\frac{1}{60}$ second, the shutter speed can only be set to $\frac{1}{100}$ second when sufficient light exists.

When the camera is out of focus by a large amount, it is desirable to move the focusing lenses by large amounts in order to quickly bring the image into focus. However, when the focusing position becomes near, moving the focusing lens quickly will result in passing the focusing position and moving to a position where the image is again out of focus, passing over the peak of the mountain. Therefore, at the start of the focusing process, the sampling frequency is initially set to 60 Hz and the motor can be moved rapidly. As the focus point approaches, if the motor is moved slower and if the sampling frequency is set to 20 Hz which is a period of more than two fields, the focusing accuracy is improved. This is accomplished by obtaining the focus evaluation value after the driving of the motor is stopped.

Another feature of the invention allows for the camera to be used in both a still image recording mode and a moving image recording mode. Often, the shutter speed in the moving image recording mode varies when the object is being photographed whereas the shutter speed in the still recording mode is constant. The sampling frequency at the time of recording the still image is set to a different value than the sampling frequency of when moving images are recorded. In the still image recording mode, the sampling frequency can be equal to one field compared to a sampling frequency of three fields when in a moving image recording mode, thus shortening the focusing time for still images.

Another manner of decreasing the amount of time which is necessary to obtain a still image which is in focus is to record still images as the focus evaluation result is increasing and the best focusing position is being approached and passed. The focusing lens is continued to be moved until the best focusing position is passed, indicating that the focusing is becoming worse. It is necessary to focus past the best focus position in order to confirm that the best focus position was actually reached. Instead of backing the focusing lens to the position where the best focus occurs after the best focus position is passed, a still image is recorded for each of the focusing positions as the focusing position approaches the best focusing position. After the best focusing position is passed, a previously recorded image which corresponds to the best focusing position is used as the in-focus image and the other recorded images are discarded.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 2:
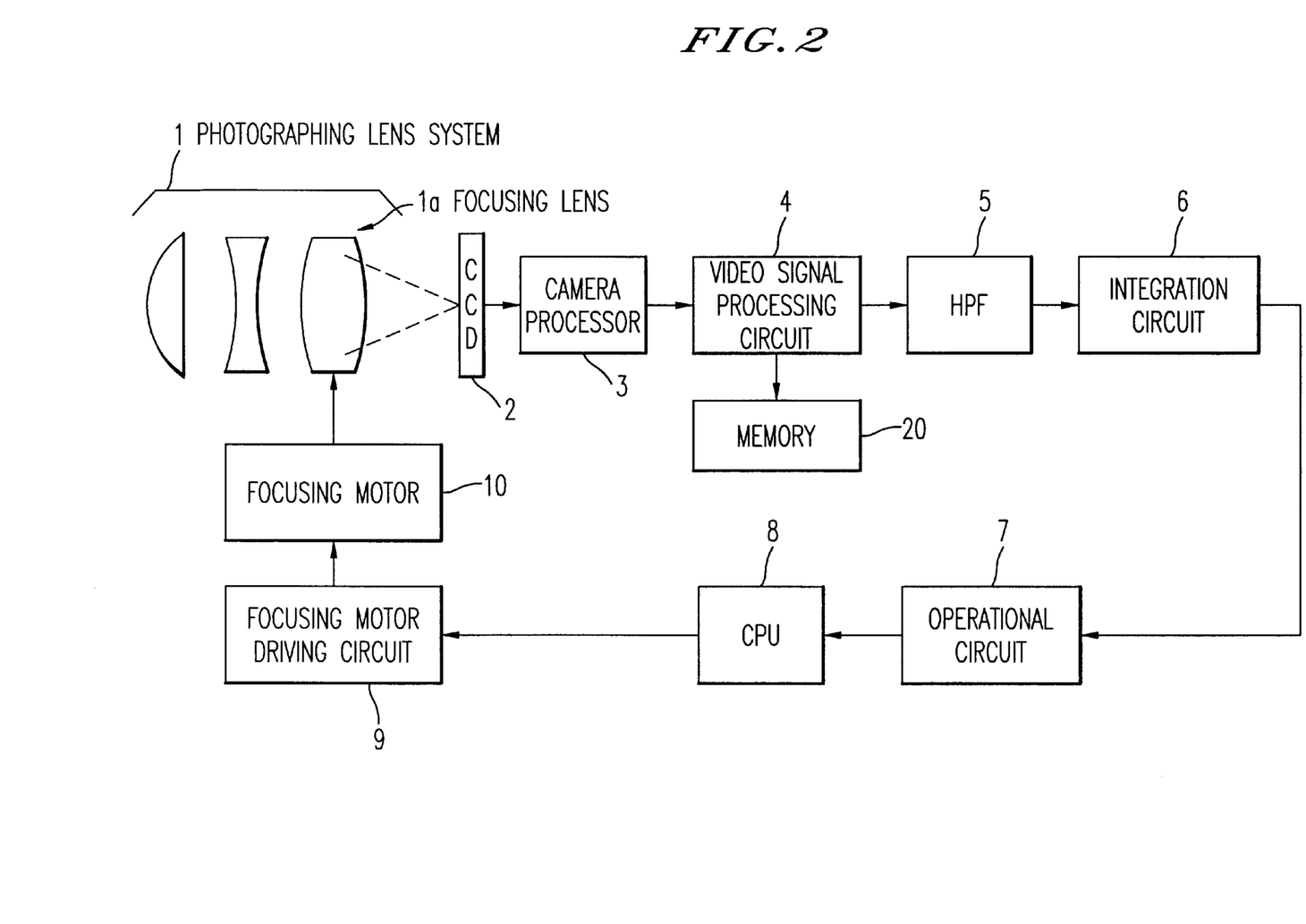
FIG. 2 is a hardware block diagram showing the construction of a focus controlling apparatus.

Referring now to the drawings, wherein like reference numerals designate identical or corresponding parts throughout the several views, and more particularly to FIG. 2 thereof, there is illustrated a block diagram showing the hardware construction of the invention. There is a photographing lens system 1 including a plurality of lenses, one of which is a focusing lens 1a. The photographing lens system 1 may include a zooming mechanism. Light from the photographing lens system 1 is focused onto a charge coupled device (CCD) 2 which is used as the image photographing element and captures an image. The CCD 2 converts the received light to an electric signal. The electric signal output from the CCD 2 is an analog signal which is input to the camera processor 3 which performs various functions on the image signal such as converting the analog signal to a digital form. The output from the camera processor 3 is input to the video signal processing circuit which converts the input digital signal into a luminance component Y, and two color difference signals Cr and Cb in a known manner.

The luminance signal Y, also referred to as a brightness signal, is output from the video signal processing circuit 4 to the high pass filter 5 which, for example, allows high frequency components above 600 KHz to pass. The high frequency component signals are output from the high pass filter 5 and input by the integration circuit 6 which integrates the high pass frequency signals. The result of this integration is the focus evaluation value. When an image is in focus, there is a large number of high frequency components as compared to when an image is out of focus. Therefore, the value of the focus evaluation value depends on whether or not an image is in focus. However, as the magnitude of the brightness component which is used to form the focus evaluation value is directly related to the brightness of the scene which is being photographed, the focus evaluation value is also affected by the brightness of the scene.

In addition to using the luminance value Y for the focusing process, the luminance value Y and color difference signals Cr and Cb are stored in a memory 20 such as a semiconductor memory such as an EEPROM or on a disk in a known manner in order to store the electronically captured image.

The focus evaluation value or integration value is output by the integration circuit to an operational circuit 7. The operational circuit 7 compares the focus evaluation value obtained from the integration circuit 6 with a predetermined reference value or comparison value. The predetermined reference or comparison value depends on the properties of the photographing lens system 1, the amplifying coefficient of the system, and the properties of the circuit within the operational circuit as it samples the focus evaluation value. The operational circuit 7 ultimately outputs whether the focus evaluation value is greater than the reference or comparison value, and may also output the focus evaluation value to the CPU 8. The high pass filter 5, integration circuit 6, and operational circuit 7 may be embodied in a digital signal processing circuit or chip within the camera. The CPU 8 gives commands to change the shutter speed, sampling frequency, and amount and direction to move the focusing lens 1a. It is to be noted that there is no requirement to have a mechanical shutter in the electronic camera but the shutter speed may be controlled by controlling the manner in which the CCD is operated. The focus motor driving commands are sent from the CPU 8 to the focusing motor driving circuit 9 which determines the signals which are to be applied to the focusing motor 10 in order to move the focusing lens 1a into focus. The focusing motor 10 moves the focusing lens 1a back and forth along the optical axis.

The focus evaluation value is closely related to the luminance value of the image. Accordingly, it is possible that the luminance value itself can be employed as the focus evaluation value. The focus evaluation value is typically based on only the center portion of an image. However, it is possible to base the focus evaluation value on a portion other than a center of the image by having a user select what portion of the image is to be evaluated using a switch. Alternatively, an entire image may be used to obtain the focus evaluation value.

Figure 3:
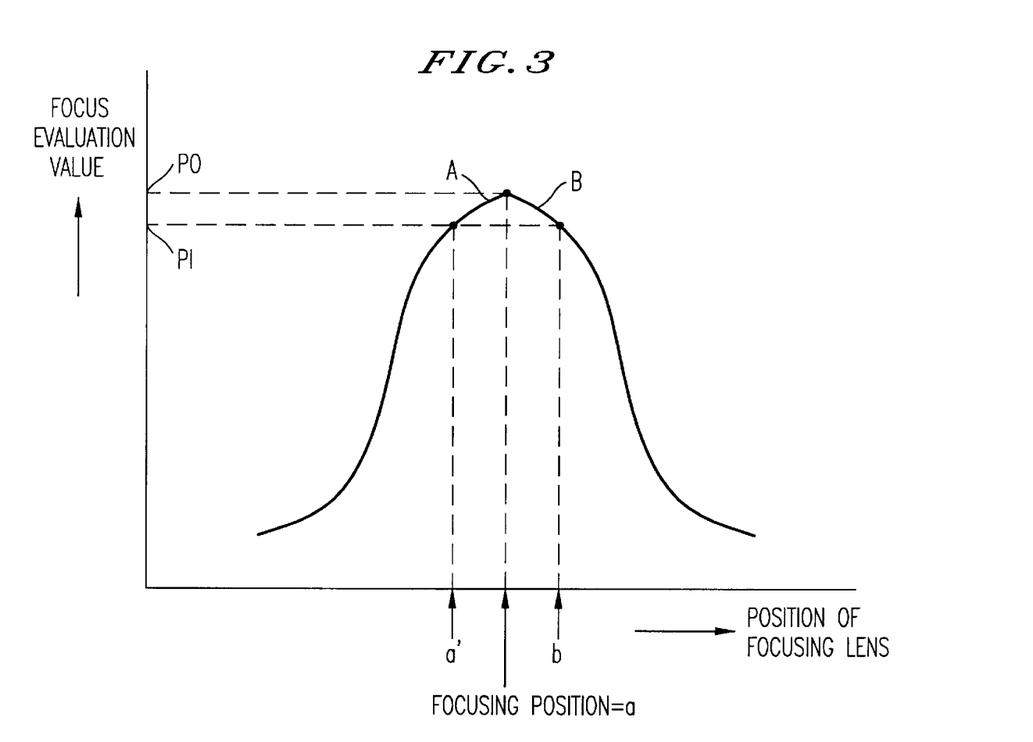
FIG. 3 is a diagram showing the relationship between the focus evaluation value and the position of the focusing lens.

FIG. 3 is a diagram of the focus evaluation value plotted versus the position of the focusing lens. This figure is used to demonstrate features of the mountain-climbing type focusing method. Assuming that the position achieving the best focus or the focusing position is "a". This results in a focus evaluation value of P0. When the focusing lens is at positions "a'" or "b", the focus evaluation value in both of these cases is P1. This diagram shows that two different lens positions can result in the same focus evaluation value.

The embodiments of the invention pertain to the use of a mountain climbing type focusing system. In order to determine in which direction, and if desired how much or how fast the focus motor is to be moved, a focus evaluation value is obtained, the lens is moved, and a subsequent focus evaluation value is obtained. Based on a comparison of the first obtained focus evaluation value and the subsequent focus evaluation value, the lens is moved in order to obtain a better focus. A new focus evaluation value is then obtained and the subsequent focus evaluation value is compared with the new focus evaluation value in order to again move the focusing lens. It is to be noted that when the lens is initially focused, only one focus evaluation value will exist and the lens will have to be moved in a predetermined direction (if desired, for a predetermined amount) so that a subsequent focus evaluation value can be obtained. Thereafter, the lens can be properly focused because two focus evaluation values exist.

As the focus evaluation value is closely related to the brightness or luminance components of the detected image, a flickering of artificial light sources such as incandescent or fluorescent lights powered by AC power sources may cause problems with focusing systems which are based on luminance components of an image. As some parts of the world use 50 Hz power sources and other parts use 60 Hz power sources, the focusing should not be affected when artificial light results from 50 Hz or 60 Hz power sources. As explained above in the "Discussion of the Background" section of the application, a known manner of preventing flicker from affecting the focusing operation is by having a field frequency of 60 Hz and having the focusing value sampling frequency every three fields or 20 Hz (every 0.05 seconds). However, as explained above, evaluating a focusing value every 20 Hz results in a larger amount of time required to determine whether the image is in focus.

In order to reduce the amount of time necessary to focus the camera, the shutter speed or amount of time necessary to capture each field is set to $1/100$ second while keeping the field frequency at 60 Hz. As 100 Hz is equal to the period of the artificial light flicker, the total amount of light detected during any $1/100$ second period will always be the same. For example, in FIG. 4, the light during period P1 is equal to the light of period P2 which is also equal to the periods P3 and P4. In order to assure that the flicker is the same for each field when the power supply of the artificial light is 60 Hz, the shutter speed of $1/100$ second is sampled with a frequency of 60 Hz. This solves the flicker problem when the AC power supply of the artificial light is 60 Hz.

While a shutter speed of $1/100$ second and a sampling frequency for each field at 60 Hz reduces flicker and allows the focus evaluation value to be rapidly determined as compared to sampling the focus evaluation value every 20 Hz, a shutter speed of $1/100$ sec. allows less light onto the CCD 2 as compared to a shutter speed of $1/60$ sec. Therefore, the shutter speed can be set to only $1/100$ sec. when there is sufficient light.

Figure 4:
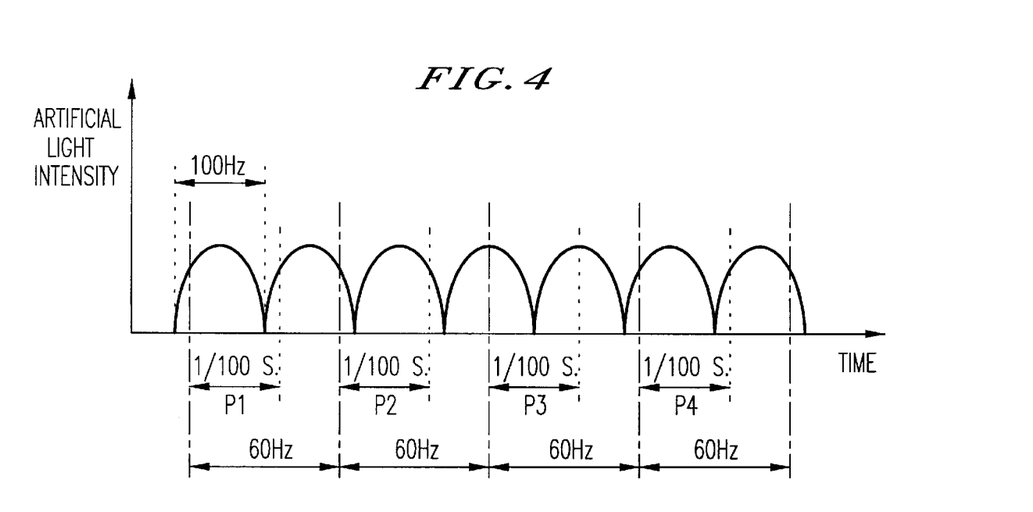
FIG. 4 is a diagram showing the intensity of artificial light produced by a 50 Hz power supply using a shutter speed of $\frac{1}{100}$ second and having a sampling frequency of 60 Hz.
Figure 5:
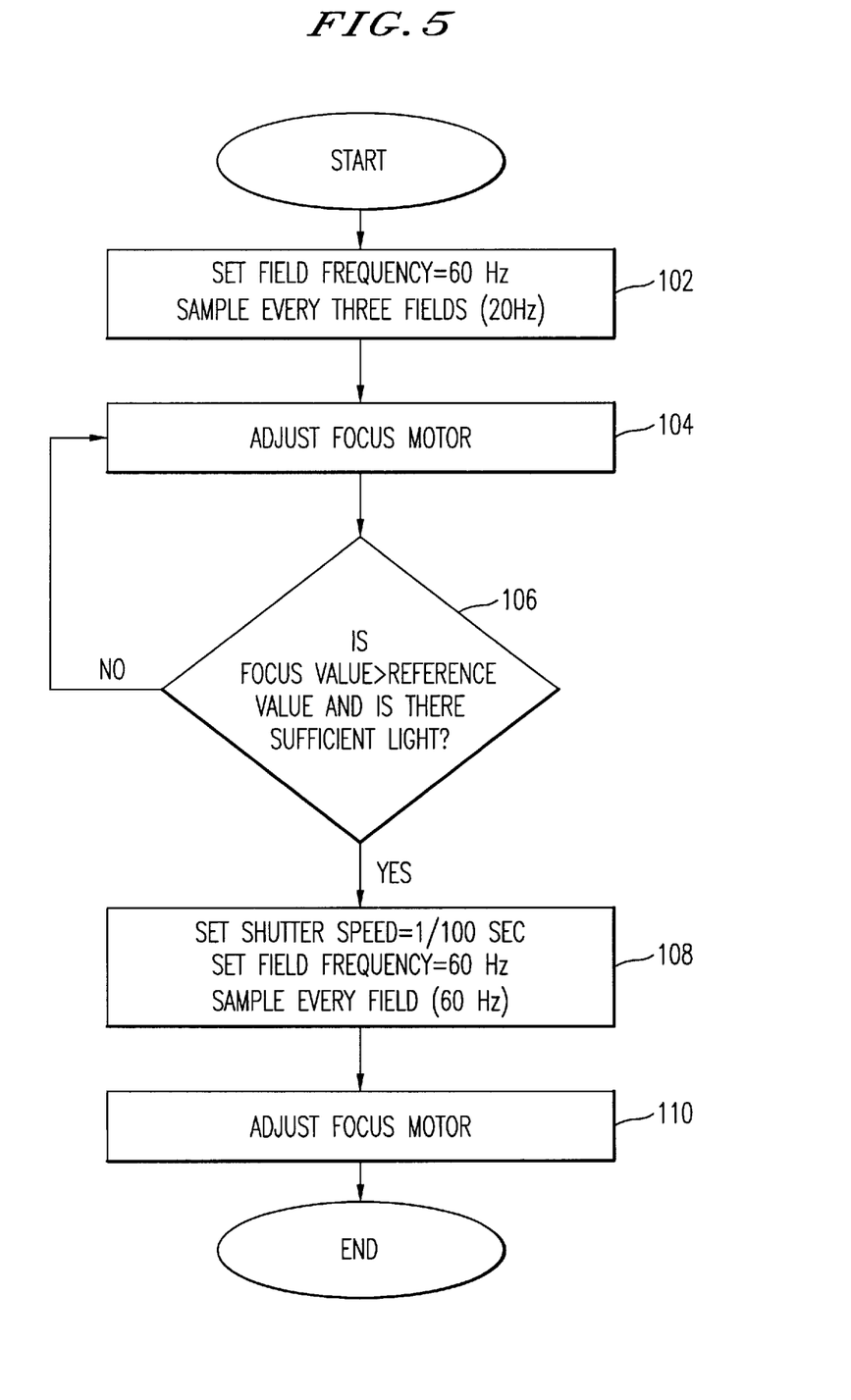
FIG. 5 is a flowchart showing when and how the shutter speed and sampling frequency is changed.

FIG. 5 illustrates a process for utilizing the values illustrated in both FIG. 1 and FIG. 4. After starting, step 102 sets the field frequency to be 60 Hz and the focus evaluation value is obtained using every third field which is a focus sampling frequency of 20 Hz. Using this set-up, the shutter speed can be set to $1/60$ sec., for example, although other shutter speeds may be used. The focus motor is adjusted in step 104 and step 106 determines if the focus value is greater than the reference value and whether there is sufficient light to have a shutter speed of $1/100$ sec. This step may be performed simply by comparing the focus evaluation value to the predetermined reference or comparison value without having a separate step of determining if there is sufficient light as the focus evaluation value is partially dependent on the brightness of the image. Alternatively, a separate step can be performed to determine if sufficient light exists to support a shutter speed of $1/100$ of a second. If there is not sufficient light, the focused motor is adjusted as need in step 104. However, if the focus evaluation is greater than the reference value and there is sufficient light to have a $1/100$ sec. shutter speed, the shutter speed is set to $1/100$ sec. and the focus evaluation value is sampled every field which has a frequency 60 Hz in step 108. The focus motor is adjusted as need in step 110 and the focusing process illustrated in FIG. 5 then ends. It is also possible simply to set the shutter speed and sampling frequency to the values set forth in step 108 whenever the focus evaluation value is greater than the reference value without a separate evaluation of the sufficiency of the light.

Another problem with the mountain climbing type focusing system is that the focus position or position where the best focus is obtained may be passed when the focusing operation occurs. For example, when the position of the focusing lens moves from position "a'" to "a", the motor is moving the focusing lens at the same time as the focus evaluation value is being determined. When the lens reaches the focusing position "a", the focus evaluation value is actually at a point between P0 and P1. This causes the focusing lens to be moved towards position "b", the next time the focusing lens is moved, thus moving the lens past the focusing position "a".

In order to prevent the above problem or reduce the severity of the problem, one feature of the invention is not to move the focusing lens 1a at the same time as the focus evaluation value is being determined. If the sampling frequency for the focusing is made to be two fields or more at the place near the focusing position and the focus evaluation value is determined when the lens is not moving, it is possible to improve the focusing accuracy and raise the focusing speed. This is accomplished by moving the focusing motor during the sampling of one field and determining the focus evaluation value during the next field. The details of this process are illustrated in FIG. 6.

Figure 6:
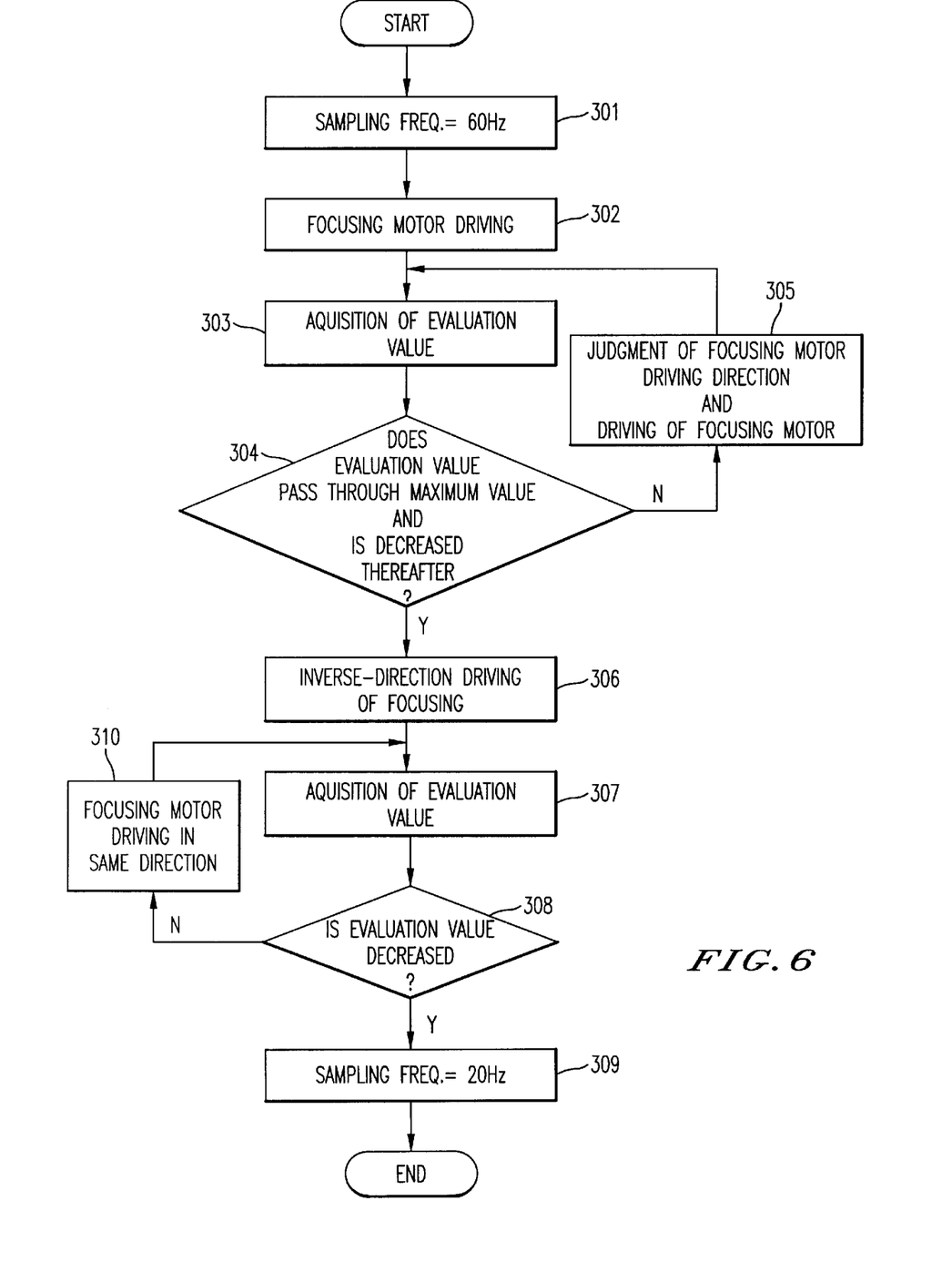
FIG. 6 is a flowchart showing an alternate process of changing the sampling frequency as the focusing lens approaches the best focusing position.

After staring in FIG. 6, step 301 sets the focus sampling frequency to be 60 Hz. Step 302 drives the focusing motor and as the focusing motor is being driven, the focusing evaluation value is obtained in step 303. Step 304 determines if the focus evaluation value passes through the maximum value and then begins to decrease. If this is not the case, step 304 continues to focus the system and steps 303, 304, and 305 are performed until step 304 determines that the maximum focus evaluation value has been passed. This allows the best focus position to be quickly reached (and passed).

Step 306 then changes the direction of the focus driving motor and determines if the focus evaluation value begins to decrease. If it does not, the focus motor is driven in the same direction in step 310. When step 308 determines that the focus evaluation value begins to decrease, the sampling frequency is set to 20 Hz. By using a longer sampling frequency near the peak of the mountain in FIG. 3, it is possible to get a more precise focusing position as the focus evaluation value is determined when the focus motor is not moving.

Some electronic cameras permit both a still image recording mode which is similar to taking individual pictures and also a moving image recording mode which is similar to a camcorder. The still image recording mode and the moving image recording mode have equal sampling periods. In the moving image recording mode, since the shutter speed varies in accordance with the state of the photographed object at the time of recording the moving image, the focus evaluation value is sampled and the focus control is executed per three fields. However, in the still picture mode, the focusing can be controlled per one field in order to shorten the focusing period when recording still images. This feature allows a camera having both a moving picture recording mode and still picture recording mode to have a shorter period of time necessary to bring the still images into focus.

As indicated above, a problem with focusing systems is that they often pass the position at which there is obtained the best possible focus. In order to confirm that the best possible focusing position has been reached, it is required that the focusing lens actually pass the best focus position in order to assure that the peak of the mountain in the mountain climbing type focusing system was reached. However, after the peak of the mountain is passed in conventional cameras, it is necessary to move the focusing lens back to the position at which the best focusing occurs in order to capture the image. However, moving the lens back to the best focusing position takes additional time.

When a camera is being used in a still image mode, it is possible to electronically store each image as the best focusing position is being approached and passed. Once the focus evaluation value begins to decrease, the best focusing position is known and as the image at this best focusing position has already been recorded, there is no need to take the extra time to move the focusing lens back to the position of best focus. All previously recorded images obtained during this focusing process can be erased except for the image at the best focusing position. A flowchart explaining the details of this process is illustrated in FIG. 7 and a timing diagram explaining the process is illustrated in FIG. 8.

Figure 7:
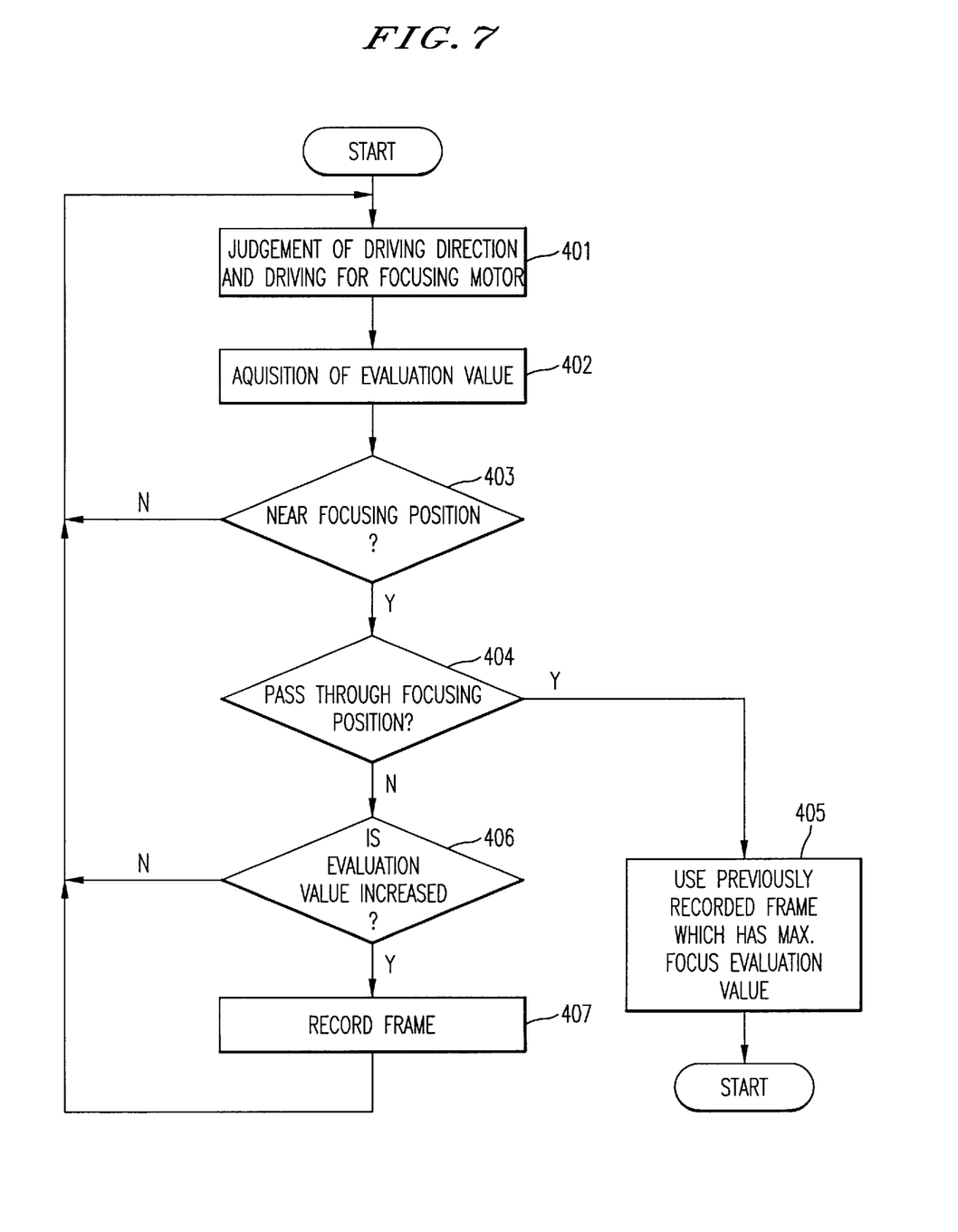
FIG. 7 is a flowchart illustrating a process of rapidly obtaining a frame having the best focus by storing the frames of images as the position of the focusing lens approaches and passes through the best focusing position.

In FIG. 7, after starting, the driving direction and amount of driving the focusing motor is determined in step 401. Initially when starting, the focusing lens can be moved in a predetermined direction and amount. When driving the motor, the focus evaluation value is acquired in step 402. Step 403 then determines if the focusing lens is near the focusing position. This may be determined by determining the amount of change in the focusing value as compared to the amount of change in the position of the focusing lens. However, step 403 is optional and is not essential to the flowchart of FIG. 7. Step 404 then determines if the focusing lens moves past or through the focusing position. This is determined by seeing if the focus evaluation value decreases.

When step 404 does not determine that the focusing position is passed, step 406 is performed which determines if the focus evaluation value increases. If it does, it means that the focusing position is being approached (or has been reached) and therefore, the frame corresponding to the image is recorded or stored in memory after the focusing motor has stopped. When the focus evaluation value does not increase, flow proceeds from step 406 back to step 401. The recording of frames continues as long as the focusing evaluation value increases. Once the focusing position is determined to be passed in step 404, step 405 uses the previously recorded frame which has the maximum focus evaluation value in order to obtain a focused image without the need to back up the focusing lens to the position having the best focus and capturing an image. The images corresponding to the other focusing positions may be discarded or erased from memory. The process of FIG. 7 then ends.

Figure 8:
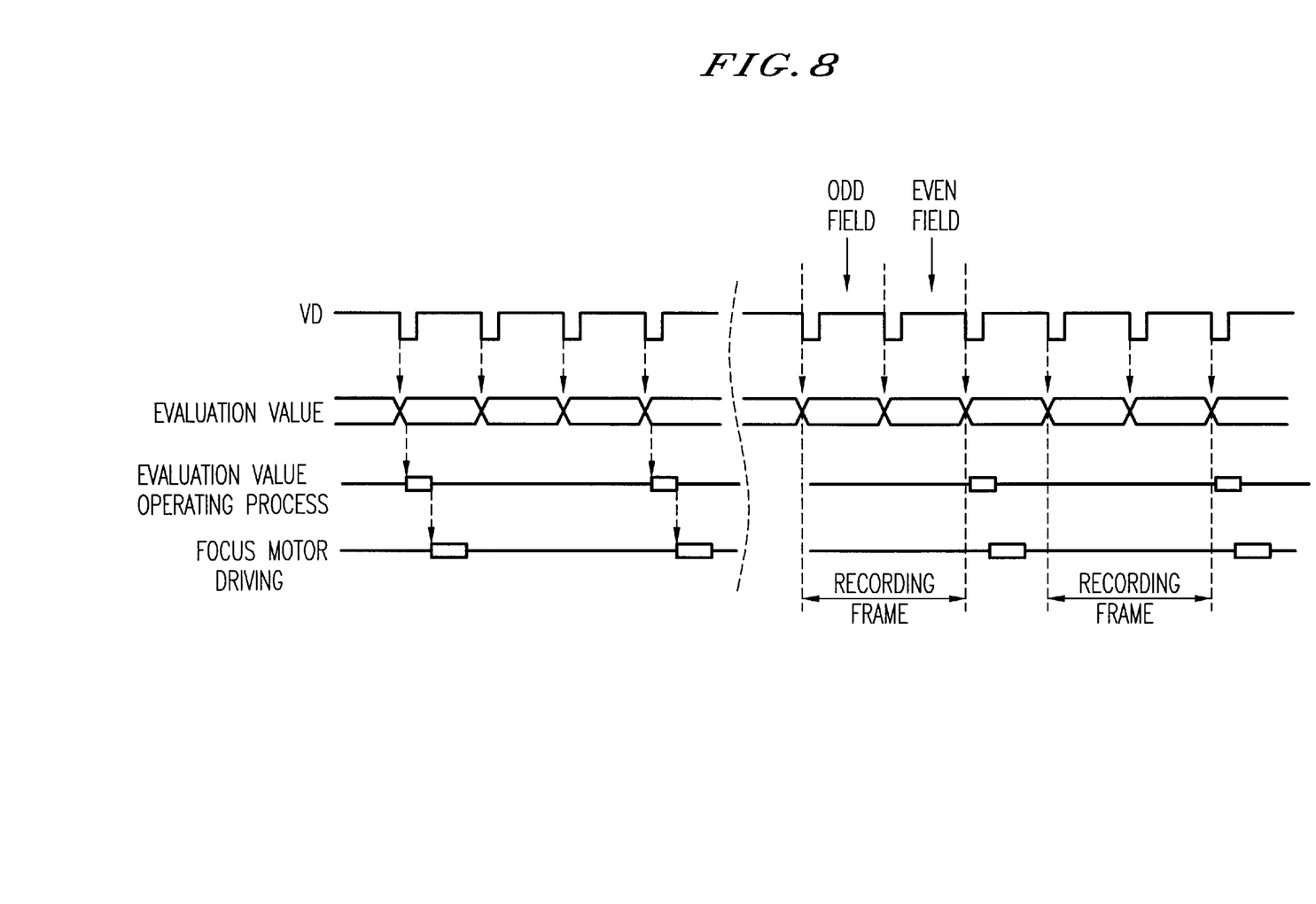
FIG. 8 is a flowchart illustrating the process of recording an image frame as the focusing lens is moved in accordance with the procedure illustrated in FIG. 7.

A timing diagram illustrating the features of the invention is illustrated in FIG. 8. In FIG. 8, a video signal VD has its down pulse represent the start of each field, and also the end of the previous field. This point in time is when the focus evaluation value is obtained. After the focus evaluation value is obtained, the focus evaluation value operating process is performed which determines the amount to move the focusing lens. Thereafter, the focus motor is driven in order to move the lens to the new position.

The broken curved vertical line in the middle of FIG. 8 signifies a division in the timing line after which the recording of frames begins. The frame is composed of an odd field and an even field which are recorded as illustrated. After this frame is recorded, the focus evaluation value operating process occurs and the focusing motor is driven. After the focusing motor stops, the next frame is recorded as illustrated. Once the focus evaluation value operating process determines that the best focusing position has passed, the previously recorded frame having the best focus evaluation value is used as the still image.

Each of the features of the present invention can be incorporated into an electronic filmless camera such as the camera illustrated in FIG. 2, the Ricoh DC-1 digital video camera which has both still and moving image recording modes or any other known camera with an electronic image pickup. Each of the values being processed by the present invention are signals corresponding to physical phenomena such as focusing characteristics of an image. The present invention can be implemented in a digital camera using an electronic processor such as a microprocessor or digital signal processor programmed according to the teachings of the present invention, as will be apparent to those skilled in the art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A method for focusing a lens, comprising the steps of:

setting a focus sampling frequency to a first sampling frequency and setting a shutter speed to a first shutter speed;

determining a first amount of light passing through the focusing lens;

determining a first focus evaluation value using the first amount of light passing through the focusing lens;

changing a position of the focusing lens by driving a motor by an amount calculated using the first focus evaluation value;

changing at least one of the focus sampling frequency and the shutter speed when the first focus evaluation value is greater than a reference value;

determining a second amount of light passing through the focusing lens, after the step of changing said at least one of the focus sampling frequency and the shutter speed;

determining a second focus evaluation value using the second amount of light passing through the focusing lens; and changing a position of the focusing lens by driving the motor by an amount calculated using the second focus evaluation value and a previously determined focus evaluation value.

2. A method according to claim 1, wherein:

said step of changing at least one of the focus sampling frequency and the shutter speed changes the shutter speed to 1/100 of a second, when the focus evaluation value is greater than the reference value.

3. A method according to claim 2, wherein:

said step of changing at least one of the focus sampling frequency and the shutter speed changes the shutter speed to 1/100 of a second from the first shutter speed which is 1/60 of a second.

4. A method according to claim 3, wherein:

said step of changing at least one of the focus sampling frequency and the shutter speed changes the shutter speed only when the determined first amount of light is greater than a predetermined threshold.

5. A method according to claim 1, wherein:

said step of changing at least one of the focus sampling frequency and the shutter speed changes the sampling frequency to 60 Hz, when the first focus evaluation value is greater than the reference value.

6. A method according to claim 5, wherein:

said step of changing at least one of the focus sampling frequency and the shutter speed changes the sampling frequency from 20 Hz to 60 Hz.

7. A method according to claim 6, wherein:

said step of changing at least one of the focus sampling frequency and the shutter speed changes the sampling frequency only when the determined first amount of light is greater than a predetermined threshold.

8. A method according to claim 7, wherein:

said step of changing at least one of the focus sampling frequency and the shutter speed changes the shutter speed to 1/100 of a second from the first shutter speed which is 1/60 of a second.

9. A method according to claim 1, wherein:

said step of changing at least one of the focus sampling frequency and the shutter speed changes the focus sampling frequency from the first sampling frequency to a second sampling frequency which is longer than the first sampling frequency when the focus evaluation value is greater than the reference value, indicating that the focus lens is approaching a position which achieves a best focus position.

10. A method according to claim 9, wherein:

said step of changing at least one of the focus sampling frequency and the shutter speed changes the focus sampling frequency from the first sampling frequency which is 60 Hz to a second sampling frequency which is 20 Hz.

11. A method according to claim 9, wherein:

said step of changing at least one of the focus sampling frequency and the shutter speed changes the focus sampling frequency; and after said step of changing at least one of the focus sampling frequency and the shutter speed, the position of the focusing lens is not changed while an amount of light passing through the focusing lens is being determined.

12. A method according to claim 11, wherein:

before said step of changing at least one of the focus sampling frequency and the shutter speed, the position of the focusing lens is changed while the amount of light passing through the focusing lens is being determined.

13. A method according to claim 1, wherein the step of changing a position of the focusing lens using the first focus evaluation value changes the position of the lens using both the first focus evaluation value and a focus evaluation value determined before the first focus evaluation value was determined.

14. A method of focusing and capturing an image by a camera, comprising the steps of:

obtaining a first focus evaluation value;

recording a first image in a memory;

focusing the camera using the first focus evaluation value;

obtaining a second focus evaluation value which indicates that a focus of the camera is better than a focus indicated by the first focus evaluation value;

recording a second image in the memory;

focusing the camera using the second focus evaluation value and a previously obtained focus evaluation value;

obtaining a third focus evaluation value which indicates that a focus of the camera is worse than a focus indicated by the second focus evaluation value; and selecting the second image as an image having a best focus, using the second and third focus evaluation values.

15. A method according to claim 14, further comprising the step of:

erasing the first image from the memory while retaining the second image in the memory.

16. A method according to claim 14, further comprising the steps of:

recording a third image in the memory, after the step of focusing using the second focus evaluation value and the previously obtained focus evaluation value; and erasing the first and third images from the memory while retaining the second image in the memory.

17. A method according to claim 14, wherein the step of focusing the camera using the first focus evaluation value focuses the camera using both the first focus evaluation value and a focus evaluation value obtained before the first focus evaluation value was obtained.

18. A camera, comprising:

a focusing lens;

a motor for driving the focusing lens;

an image pick-up for recording an image focused by the focusing lens;

a focus evaluation value generator which generates focus evaluation values using a brightness component of an image detected by the image pick-up;

means for setting a camera focus sampling frequency to a first sampling frequency and setting a camera shutter speed to a first shutter speed;

means for determining a first focus evaluation value using a first determined amount of light which has passed through the focusing lens and is detected by the image pick-up;

means for calculating an amount to drive the motor in order to focus the focusing lens using the first focus evaluation value;

means for changing at least one of the camera focus sampling frequency and the camera shutter speed when the first focus evaluation value is greater than a reference value; and means for determining a second focus evaluation value using a second determined amount of light which has passed through the focusing lens and is detected by the image pick-up, after the means for changing has changed said at least one of the camera focus sampling frequency and the camera shutter speed.

19. A camera according to claim 18, wherein:

said means for changing at least one of the camera focus sampling frequency and the camera shutter speed changes the camera shutter speed to $1/100$ of a second, when the focus evaluation value is greater than the reference value.

20. A camera according to claim 19, wherein:

said means for changing at least one of the camera focus sampling frequency and the camera shutter speed changes the camera shutter speed to $1/100$ of a second from the first shutter speed which is set to $1/60$ of a second by the means for setting.

21. A camera according to claim 20, wherein:

said means for changing at least one of the camera focus sampling frequency and the camera shutter speed changes the shutter speed only when the first determined amount of light is greater than a predetermined threshold.

22. A camera according to claim 18, wherein:

said means for changing at least one of the camera focus sampling frequency and the camera shutter speed changes the camera sampling frequency to 60 Hz, when the first focus evaluation value is greater than the reference value.

23. A camera according to claim 22, wherein:

said means for changing at least one of the camera focus sampling frequency and the camera shutter speed changes the camera sampling frequency from 20 Hz which was set by the means for setting to 60 Hz.

24. A camera according to claim 23, wherein:

said means for changing at least one of the camera focus sampling frequency and the camera shutter speed changes the camera sampling frequency only when the determined first amount of light is greater than a predetermined threshold.

25. A camera according to claim 24, wherein:

said means for changing at least one of the camera focus sampling frequency and the camera shutter speed changes the camera shutter speed to $1/100$ of a second from the first shutter speed which is $1/60$ of a second.

26. A camera according to claim 18, wherein:

said means for changing at least one of the camera focus sampling frequency and the camera shutter speed changes the camera focus sampling frequency from the first sampling frequency to a second sampling frequency which is longer than the first sampling frequency when the focus evaluation value is greater than the reference value, indicating that the focusing lens is approaching a position which achieves a best focus position.

27. A camera according to claim 26, wherein:

said means for changing at least one of the camera focus sampling frequency and the camera shutter speed changes the camera focus sampling frequency from the first sampling frequency which is 60 Hz to a second sampling frequency which is 20 Hz.

28. A camera according to claim 26, wherein:

said means for changing at least one of the camera focus sampling frequency and the camera shutter speed changes the camera focus sampling frequency; and after said means for changing at least one of the camera focus sampling frequency and the camera shutter speed changes the at least one of the camera shutter speed and the camera focus sampling frequency, the position of the focusing lens is not changed while an amount of light passing through the focusing lens is being determined by the image pick-up.

29. A camera according to claim 28, wherein:

before said means for changing at least one of the camera focus sampling frequency and the camera shutter speed changes the at least one of the camera shutter speed and the camera focus sampling frequency, the position of the focusing lens is changed by the motor while an amount of light passing through the focusing lens is being determined by the image pick-up.

30. A camera according to claim 18, wherein the means for calculating calculates the amount to drive the motor using both the first focus evaluation value and a focus evaluation value determined before the first focus evaluation value was determined.

31. A camera, comprising:

means for obtaining a first focus evaluation value;

means for recording a first image in a memory;

means for focusing the camera using the first focus evaluation value;

means for obtaining a second focus evaluation value which indicates that a focus of the camera is better than a focus indicated by the first focus evaluation value;

means for recording a second image in the memory;

means for focusing the camera using the second focus evaluation value and a previously obtained focus evaluation value;

means for obtaining a third focus evaluation value which indicates that a focus of the camera is worse than a focus indicated by the second focus evaluation value; and means for selecting the second image as an image having a best focus, using the second and third focus evaluation values.

32. A camera according to claim 31, further comprising:

means for erasing the first image from the memory while retaining the second image in the memory.

33. A camera according to claim 31, further comprising:

means for recording a third image in the memory, after the means for focusing focuses using the second focus evaluation value focuses the camera and the previously obtained focus evaluation value; and means for erasing the first and third images from the memory while retaining the second image in the memory.

34. A camera according to claim 31, wherein the means for focusing the camera using the first focus evaluation value focuses the camera using both the first focus evaluation value and a focus evaluation value obtained before the first focus evaluation value was obtained.

* * * * *